United States Patent [19]

Oertle

[11] 4,071,011

[45] Jan. 31, 1978

[54] PORT CLOSURE APPARATUS FOR DIFFERENTIALLY PRESSURED VESSELS

[75] Inventor: Donald H. Oertle, Ponca City, Okla.

[73] Assignee: Continental Oil Company, Ponca City, Okla.

[21] Appl. No.: 749,189

[22] Filed: Dec. 9, 1976

Related U.S. Application Data

[63] Continuation-in-part of Ser. No. 556,254, March 7, 1975, abandoned.

[51] Int. Cl.² .............................................. F16K 1/02
[52] U.S. Cl. .................................... 137/317; 251/144
[58] Field of Search ................. 251/144, 291; 137/317

[56] References Cited
U.S. PATENT DOCUMENTS

| 363,763 | 5/1887 | Puffer | 251/144 X |
| 460,075 | 9/1891 | Schmedling | 251/291 X |
| 1,455,796 | 5/1923 | Logan | 251/144 |
| 2,464,563 | 3/1949 | Doeg | 251/291 X |
| 2,827,913 | 7/1955 | Wagner | 251/291 X |

FOREIGN PATENT DOCUMENTS 529,741  12/1921  France ................................ 251/144

Primary Examiner—William R. Cline
Attorney, Agent, or Firm—A. Joe Reinert

[57] ABSTRACT

A low profile port closure apparatus which consists of a port positioned on the vessel to be sealed, a threaded sealing means for effecting fluid-tight closing of said port, and pressure retaining manifold structure which enables sealing positioning and removal of the sealing means in said port, and which manifold means is removable from operative position.

2 Claims, 2 Drawing Figures

PORT CLOSURE APPARATUS FOR DIFFERENTIALLY PRESSURED VESSELS

REFERENCE TO RELATED APPLICATION

This application is a continuation-in-part of application Ser. No. 556,254 filed Mar. 7, 1975 having copendency herewith, and now abandoned.

BACKGROUND OF THE INVENTION

1. Field of the Invention

The invention relates generally to a port closure device for differentially pressured vessels and, more particularly, but not by way of limitation, it relates to an improved closure apparatus which allows pressure differentiating communication with a vessel interior without use of a valve.

2. Description of the Prior Art

The prior art includes numerous types of sealing methods applicable to pressurized or evacuated vessels, but to applicant's knowledge, all such prior art devices utilize either a mechanical valve or a permanent type of seal such as glass fusion seal or a solder seal, such devices being more commonly known as vacuum tubes or tin cans, respectively.

SUMMARY OF THE INVENTION

The present invention contemplates a pressurized vessel sealing device wherein an entry port to the vessel interior may be sealingly closed by means of a sealing assembly by thread, force or such affixure, and the device includes manifold structure which is sealingly connectable over the port and seal assembly for effecting operation of the seal into and out of sealing engagement without loss of differentiation of pressure to the exterior. After affixure of the seal, for example after effecting pressurization or evacuation of the vessel interior, the manifold assembly is removable such that only the low profile seal and port device remains. A port closure device constructed in accordance with the present invention is particularly adapted for utilization in combination with a hydrogen probe and getter ion pump assembly to provide both a sealable pressurization entry and/or fluid sensing communication with the getter ion pump interior.

Therefore, it is an object of the present invention to provide a device for sealing a pressure or vacuum vessel with a low profile closure that will allow repeated use.

It is also an object of the present invention to provide an apparatus for sealing a differentially pressured vessel interior which does not utilize a valve-type structure.

It is yet another object of the invention to provide a structure for sealing a pressurized vessel which is of low profile to lessen the possibility of mechanical damage to outwardly projecting components of the overall structure.

Finally, it is an object of the present invention to provide a sealing device for a pressurized vessel, or which can be used in affixure of fluid communication sensing probes and the like without necessitating the use of a separate valve or permanent seal structure.

Other objects and advantages of the invention will be evident from the following detailed description when read in conjunction with the accompanying drawings which illustrate the invention.

DESCRIPTION OF THE PREFERRED EMBODIMENTS

Figure 1:
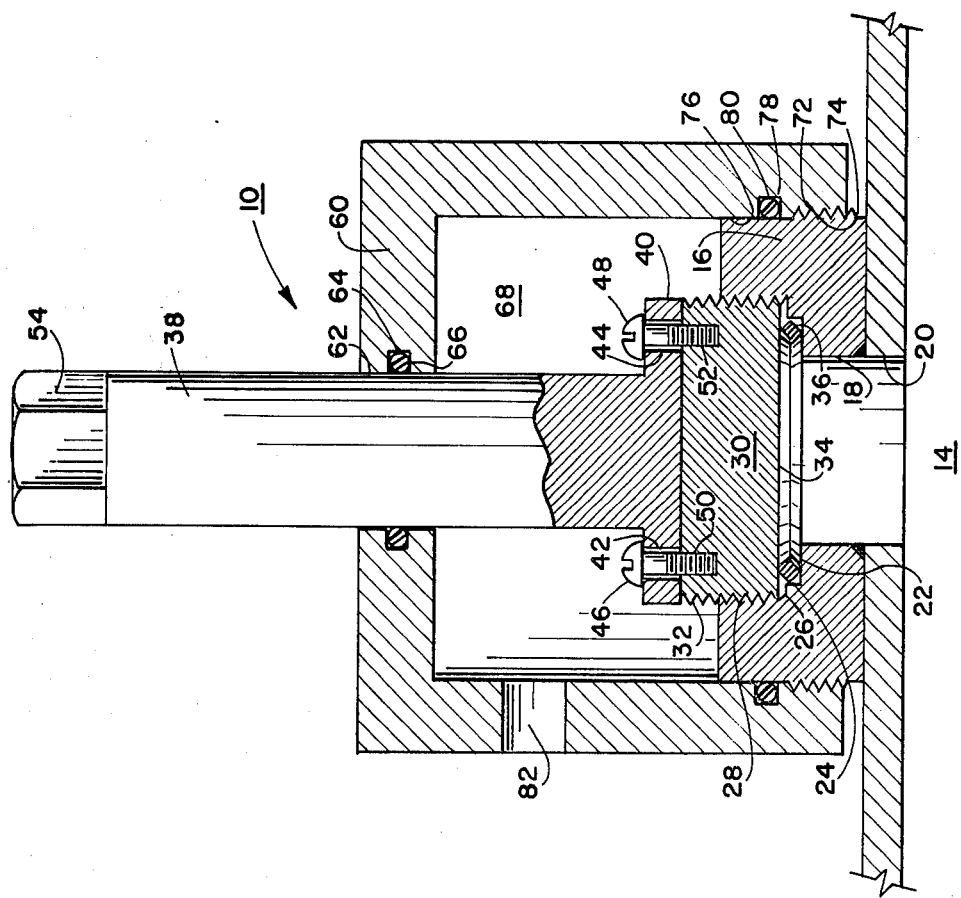
FIG. 1 is a vertical section of port closure assembly constructed in accordance with the present invention.

FIG. 1 illustrates the basic form of invention wherein a sealing assembly 10 is disposed in operative placement on a vessel 12 of the type having interior 14 at a differential pressure from the exterior, i.e. vessel interior 14 may be either pressurized or evacuated relative to the external pressure. Referring more particularly to sealing assembly 10, a port ring 16 having an internal axial bore is suitably affixed in gas-tight manner in alignment with a bore 20 formed through the wall of the vessel 12. The ring 16 may be sealingly secured to vessel 12 in any of conventional manners, as by welding shown in FIG. 1; however, it is also contemplated that some applications may utilize a seal and threaded cap ring as inserted through bore 20 for threaded engagement within bore 18 of port ring 16.

The port ring 16 includes an axial counterbore portion which is formed to define an annular sealing seat 22 terminating in a cylindrical wall 24 which in turn extends to an annular surface 26 and axial threaded bore 28 extending to the counterbore entry of port ring 16. A seal plug 30 having outer threads 32 is then received within threaded bore 28 to effect sealing closure of entry bore 18 by means of end surface 34 and sealing ring 36. It should be understood that while a particular vacuum sealing structure, i.e. sealing ring 36, is shown and described, any of conventional sealing means including the more conventional O-ring type of sealer may be utilized for many applications.

A stem 38 is then releasably attached to the upper surface of sealing plug 30 to provide manipulating access thereto. Stem 38 is formed as a cylindrical, elongated structure having a lower annular rim 40 with diametrically opposed bores 42 and 44 formed therethrough for the purpose of receiving respective fasteners 46 and 48 which are aligned for and received within threaded bores 50 and 52, respectively, in the top surface of sealing plug 30. The upper (outer) end of stem 38 may be formed with flats 54 or other means to enable turn gripping during operation.

A manifold having a cylindrical side wall 58 and top wall 60 is conformed for sealing engagement down over stem 38 and port ring 16. A central axial bore 62 is formed through upper wall 60, and bore 62 includes a central annular slot 64 for the purpose of receiving a sealing ring 66 which provides pressure tight seal between interior 68 of manifold 56 and the external environment. An inner cylindrical wall 70 is formed to include threads 72 around a lower portion, threads 72 being engageable with threads 74 formed about the lower portion of cylindrical side wall 76 of port ring 16. An annular groove 78 is cut about the inner side wall 70 of manifold 56 immediately above threads 72 in order to receive a sealing ring 80 for sealing engagement with cylindrical side wall 76 of port ring 16. An entry conduit 82 is formed through cylindrical side wall 76 for communication between manifold interior space 68 and an external pressure application or evacuation source.

Entry port 82 may be pipe threaded for receiving pipe or for use of tubing connection in conventional manner.

In operation, sealing plug 30 may be attached to stem 38 by means of screw fasteners 46 and 48, whereupon stem 38 is fitted through axial bore 62 of manifold 56 and retracted up within interior 68 into contact with the underside of top surface 60 of manifold 56. The sealing ring 36 is then placed around annular seating surface 22 of port ring 16, and the manifold 56 is then slid down over the outer cylindrical wall of port ring 16 for threaded engagement of port ring threads 74 and manifold internal threads 72, thus moving sealing ring 80 down over cylindrical outer wall 76 to effect sealing engagement. Application of pressurization or evacuation via port 82 may then proceed since stem 38 is withdrawn upward and sealing plug 30 is not in engagement.

When the interior 14 of vessel 12 is at the desired pressure or absence thereof, the stem 38 is pushed downward until sealing plug threads 32 engage the internal threads 28 of the counter bore of port ring 16, and sealing plug 30 is rotated into tight threaded engagement effecting a seal via sealing ring 36 when tightly retained between bottom surface 34 and annular sealing seat 22. Rotation of stem 38 is effected by a handle, wrench or other suitable means in engagement with the angular flats formation 54.

After sealing plug 38 is tightly in place and sealing is effected, the manifold 56 can then be rotated to be removed to disengage stem 38 with the resulting low profile sealing plug 30 in place over vessel port 20 to retain the desired pressurization in interior 14, and fasteners 46 and 48 can then be removed from sealing plug 30. If it is desired to alter or replenish pressurization via port 82 at some later time, an operator need only assemble the stem 38 onto sealing plug 30 with insertion of manifold 58 downward thereover into sealing, threaded engagement around port ring 16 to enable rotation of stem 38 and disengagement of sealing plug 30 within port ring 16.

Figure 2:
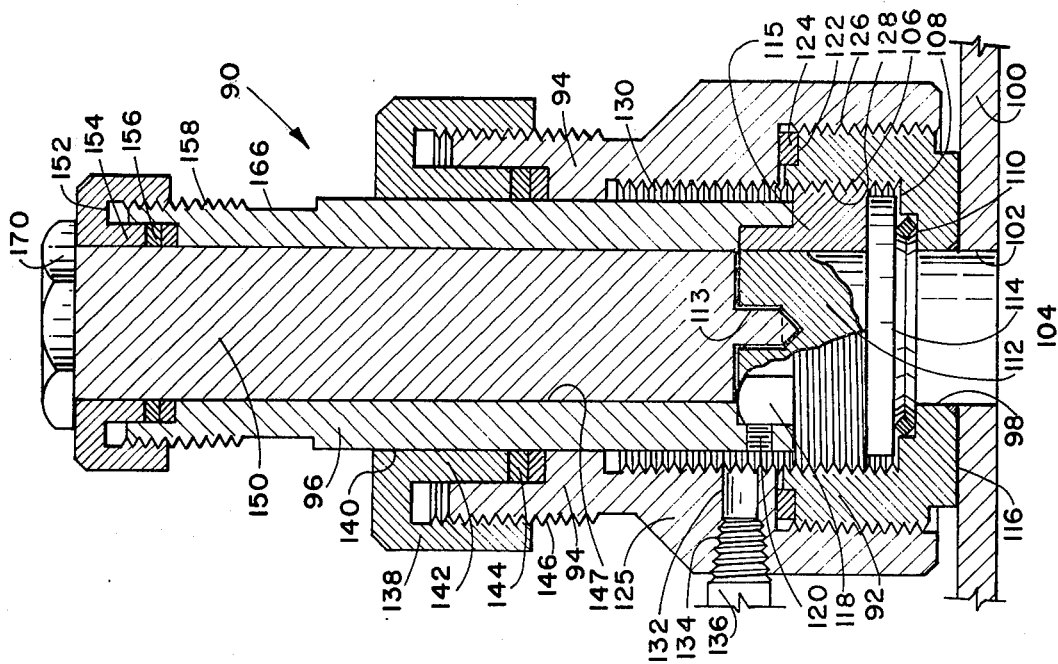
FIG. 2 is a vertical partial section of an alternative form of the invention as utilized in combination with certain forms of vacuum device assembly.

FIG. 2 illustrates an alternative embodiment of the present invention which is more particularly adapted for use with either a low profile sealing plug or a gas sensing probe having variable pressures sensing capacity. The particular structure is adapted for use with a hydrogen probe of the type employed with getter ion pumps as employed, e.g. in certain forms of corrosion monitoring apparatus for chemical reactors, storage vessels, pipelines and the like. Thus, FIG. 2 illustrates a sealing assembly 90 which includes a port ring 92, manifold 94, and a hollow stem 96 extending into operative engagement with a captive ring 115.

The port ring 92 includes a central axial bore 98 and may be welded or otherwise affixed in pressure-type relationship to such as a getter-ion vessel 100 with communication via an entry port 102 to interior 104 of the vessel 100. Port ring 92 is formed with a counterbore having threaded inner wall 106 terminating in an annular shoulder 108 and still further in an annular sealing seat 110 adjacent bore 98. A sealing plug 112 having an Allen insert 113 is then received within threaded captive ring 115 in keyed affixure, and ring 115 is threaded within port ring 92 to bring the lower surface 114 of plug 112 into sealing engagement with a sealing ring 116 as forced against sealing surface 110. The upper portion of ring 115 may be formed as a hexagonal or wrench gripping head 118 to provide an interference fit within tubular stem 96 when a set screw 120 is firmly seated. Allen insert 112 serves to enable holding of plug 112 during tightening of ring 115 thereby to assure best edge seal.

An annular sealing shoulder 122 is provided about the upper periphery of port ring 92 to provide seating for a sealing or packing ring 124 providing pressure-tight seal between port ring 92 and manifold 94. The manifold 94 is formed with an inner threaded bore 126 about the lower extremity for the purpose of threaded engagement down over the outer threaded surface 128 of port ring 92 in such manner as to compress packing ring 124 and provide the requisite seal. The manifold 94 defines an interior space 130 and includes a radial bore 132 having pipe threads 134 or other means for affixure to an external pressurization or evacuation source 136. The upper portion of manifold 94 consists of a threaded cap 138 having a central bore 140 defining a concentric packing ring 142 which forces sealing engagement by means of seals or packing glands 144 when cap 138 is tightly screwed around upper circumferal threads 146 of manifold 94.

The tubular stem 96 is designed to have a central bore 147. Sealing of stem 96 is effected by means of Allen wrench shaft and unitary plug 150 as secured by a cap screw 152 having a concentric packing ring 154 causing downward compression on packing rings 156 when cap screw 152 is tightly screwed down on upper peripheral threads 158 of the tubular stem 96. The flats 170 of the top collar of plug and Allen shaft 159 enable plug 112 to be held stationary during tightening of ring 115 by means of rotation of hollow stem 96 and by means of flats 166 to assure sealing surfaces, i.e., lower surface 114 and sealing seat 110.

The foregoing discloses teachings relating to a novel sealing apparatus for differentially pressured vessels wherein a low profile sealing device is readily manipulatable within a sealed manifold covering without danger of loss of pressurization.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A low profile device for sealing a differentially pressured vessel having an entry port, comprising:

low profile port means having a central passage therethrough and being secured to the vessel with the central passage in axial alignment with the entry port by non-protrudable means, the low profile port means comprising a cylindrical ring means including a circumferentially outer and (with respect to the vessel) inner threaded portion protected by a (with respect to the vessel) outer shoulder and a circumferentially inner and (with respect to the vessel) outer threaded bore of greater diameter and outer of an annular sealing surface surrounding the central passage; and a sealing ring seat on the annular sealing surface;

low profile sealing plug means the sealing plug means comprising a cylindrical plug having circumferentially outer threads for engagement with the cylindrical ring means in the circumferentially inner threaded bore, and having an inner (with respect to the vessel) flat end surface for sealing contact with the sealing ring means in bearing upon the annular sealing surface, insertable within the central passage in pressure-tight sealing connection between the annular sealing surface and the sealing plug means;

manifold means disposed over the sealing plug means and port means and sealingly connected about the outer periphery of the port means having an inner circumferential threaded portion and providing sealed fit over the port means;

access means formed through the manifold means to enable selective fluid communication between the exterior and interior of the manifold means; and stem means sealingly disposed through the manifold means in rotatable realtionship for rotatable affixture to the plug means thereby to enable manipulation of the plug means into and out of sealing connection within the central passage of the port means;

further characterized that;

manipulation of the plug means by means of the stem means into sealing connection within the central passage of the port means seals the differentially pressured vessel to enable removal of the manifold means and stem means thereby to reveal a low profile seal of the differentially-pressured vessel.

2. A device as set forth in claim 1 wherein the stem means comprises:

an elongated cylindrical stem having one end including a flanged surface for removable fastening of the stem to the sealing plug, and having the other end formed for rotational gripping for use in controlling positioning of the sealing plug.

* * * * *